Patented May 2, 1939

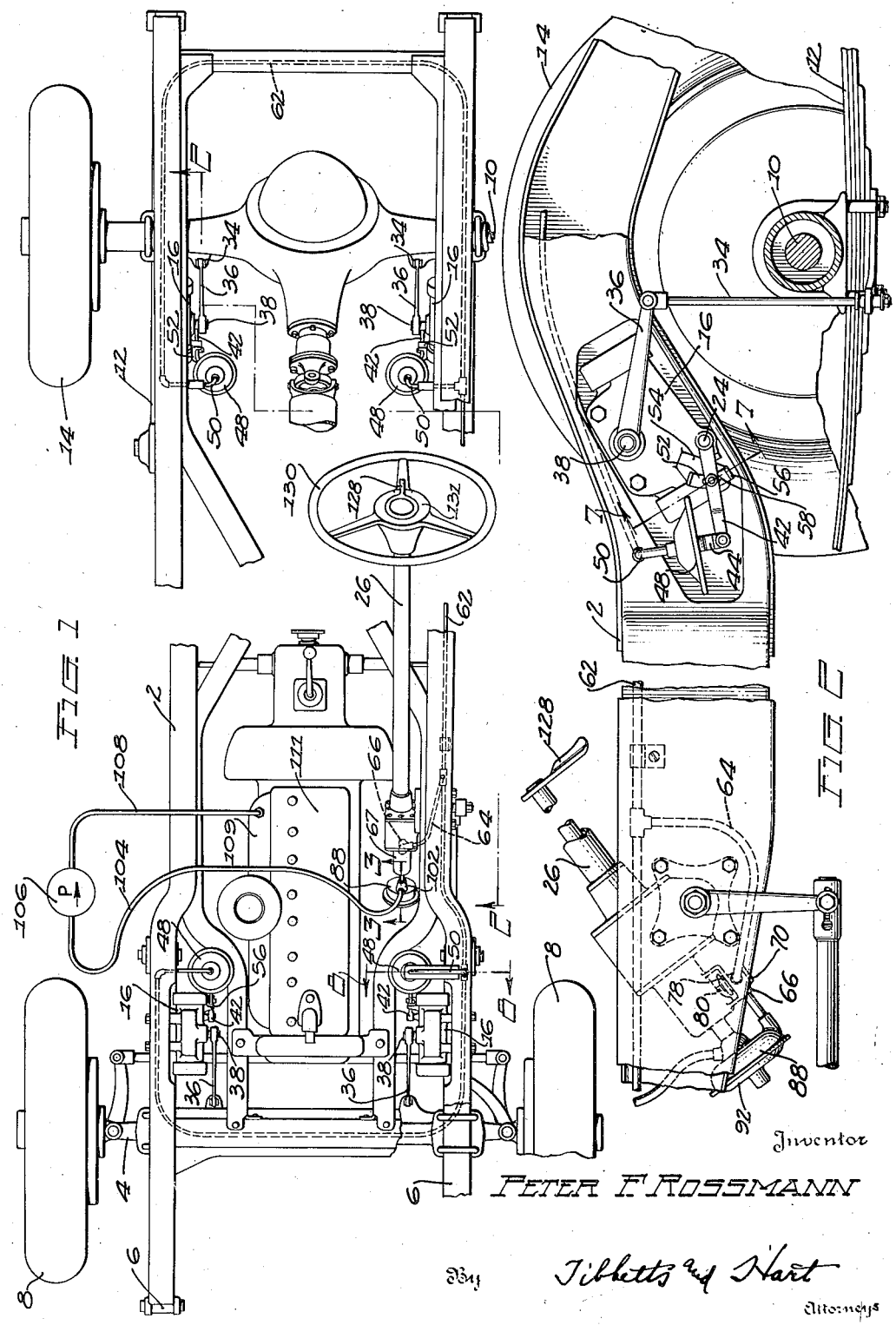

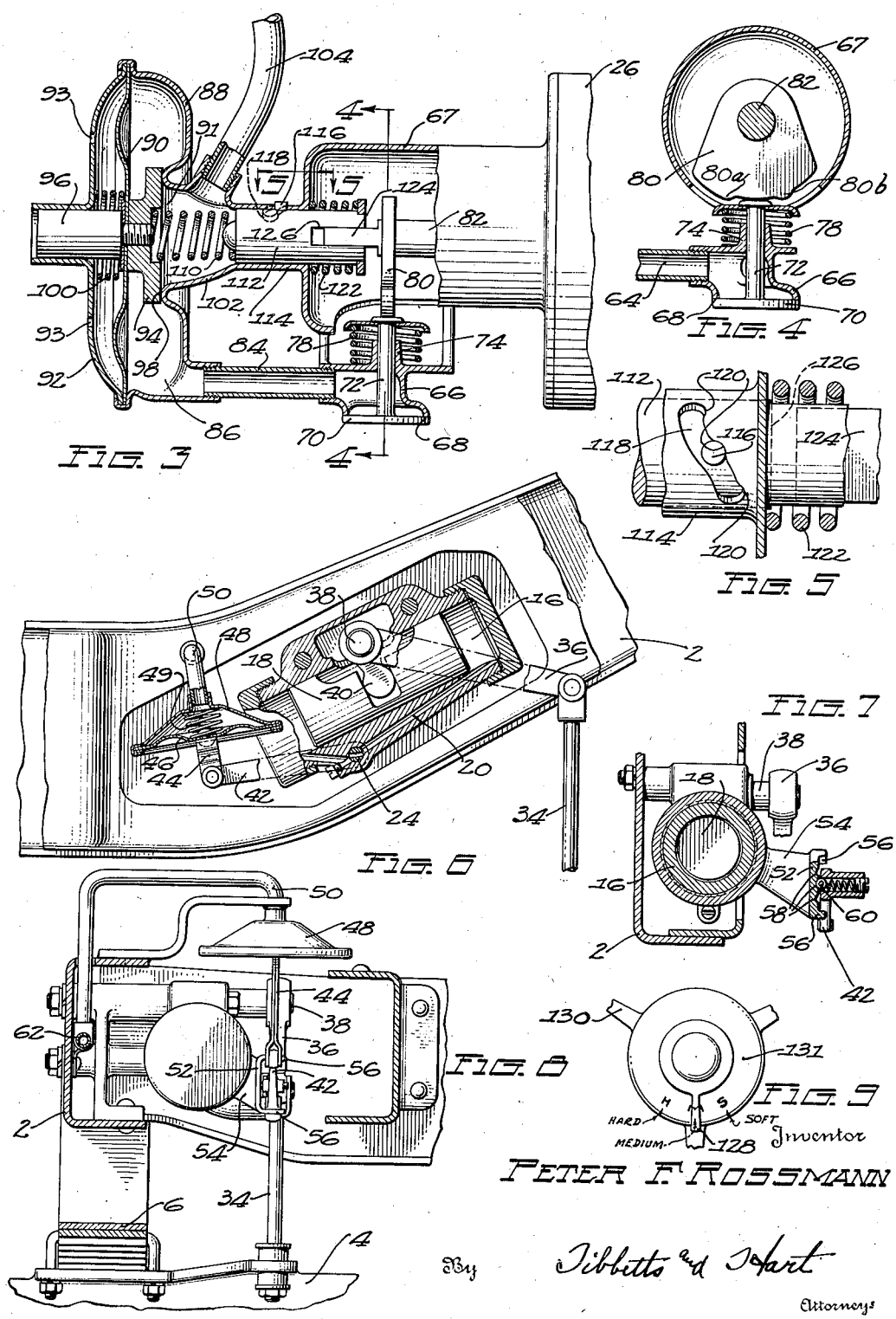

2,156,546

UNITED STATES PATENT OFFICE 2,156,546

SHOCK ABSORBER CONTROL MEANS

Peter F. Rossmann, Detroit, Mich., assignor to Packard Motor Car Company, Detroit, Mich., a corporation of Michigan Application January 10, 1935, Serial No. 1,261

7 Claims. (Cl. 137—153)

This invention relates to motor vehicles and more particularly to a mechanism for adjusting certain of the parts of such vehicles in different positions. The invention is illustrated in this application as embodied in a mechanism for adjusting the control elements of the shock absorbers of a motor vehicle to control the character of the ride. The invention is not limited in its application however, to use in connection with shock absorbers but certain features thereof may be employed with advantage in mechanisms for adjusting other parts of motor vehicles.

One object of the invention is to produce a novel and improved mechanism by which an element, device or mechanism may be readily adjusted selectively in any one of two or more definite positions in accordance with the setting of a control element in a corresponding position.

Another object of the invention is to produce an air pressure operated mechanism having a remote manual control by which an element device or mechanism may be adjusted selectively in any one of two or more predetermined positions.

Another object of the invention is to produce an improved mechanism by which the control elements of the shock absorbers of a motor vehicle may be simultaneously adjusted to regulate the character of the ride.

Another object of the invention is to produce a vacuum operated mechanism by which the control devices of a plurality of shock absorbers each having two or more regulating positions may be selectively adjusted simultaneously in accordance with the setting of a manually adjusted control element.

With the above and other objects in view the invention consists in a construction embodying the novel and improved features hereinafter described and particularly pointed out in the claims, the advantages of which will be readily understood by those skilled in the art.

The invention will be clearly understood from the accompanying drawings illustrating a construction embodying the invention in its preferred form and the following detailed description of the construction therein shown.

In the drawings

Fig. 1 is a plan view illustrating the chassis of a motor vehicle having the invention applied thereto with certain parts broken away.

Fig. 2 is a view partially in side elevation and partially in vertical section taken substantially on the line 2—2 of Fig. 1.

Fig. 3 is a detail sectional view taken substantially on the line 3—3 of Fig. 1 and illustrating particularly certain parts of a vacuum operated mechanism.

Fig. 4 is a detail sectional view taken substantially on the line 4—4 of Fig. 3.

Fig. 5 is a detail sectional view taken substantially on the line 5—5 of Fig. 3.

Fig. 6 is a detail view in vertical section and illustrating particularly one of the shock absorbers and certain associated parts.

Fig. 7 is a detail sectional view taken substantially on the line 7—7 of Fig. 2.

Fig. 8 is a detail view in vertical section taken substantially on the line 8—8 of Fig. 1 and Fig. 9 is a detail view illustrating certain parts of the remote control means for the vacuum operated mechanism.

The invention is illustrated in this application as applied to a motor vehicle comprising a supporting frame indicated at 2, a front axle 4, springs 6 interposed between and connected with the axle and said frame, front wheels 8 mounted at the ends of the front axle, a rear axle 10, springs 12 interposed between and connected with a frame and said rear axle and rear wheels 14 mounted on the ends of the rear axle.

Shock absorbers are mounted on the frame and respectively connected with the axles adjacent the wheels to control the relative movement of the frame and the ends of the axles. These shock absorbers are of a conventional hydraulic type. Each of these shock absorbers has substantially the same construction and comprises a cylinder 16 fixed to one of the side members of the frame and connected pistons 18 mounted for axial movement in the cylinder. The ends of the bore in the cylinder are connected by passages 20 through which the fluid within the cylinder flows from one end of the cylinder to the other during the axial movement of the pistons in the cylinder and the flow is controlled by means of a cylindrical valve 24 having a diametrical bore and mounted for rotary adjustment in a bearing in the cylinder. The adjustment of these valves controls the movements of the pistons in the several cylinders to control the ride.

Each shock absorber is connected with the adjacent end of one of the axles by a mechanism comprising a rod 34 connected at its lower end with the axle and an arm 36 fixed to one end of a rockshaft 38 and pivotally connected with the upper end of the rod 34. Each rockshaft 38 is mounted to turn in a bearing formed in a cylinder 16 and fixed to said rockshaft within the cylinder is an arm 40 extending between the pistons 18 for actuating the same.

The valves 24 of the several shock absorbers are adjusted simultaneously to regulate the character of the ride by power means under manual control. This power means preferably consists of air pressure operated means having a remotely situated manually adjusted control. In the construction shown in this application the said power means consists of means operated by a vacuum developed by the engine. In the said construction, these valves may each be adjusted in any one of three positions selectively to give a "soft", "medium" or "hard" ride. The adjusting mechanism, however, may be constructed so that the valves may be adjusted in other positions to give additional variations in the "ride".

In the construction illustrated each valve consists of a rockshaft to the end of which, projecting from the cylinder, is fixed an arm 42 connected at its outer end by a connector 44 with the central part of a flexible diaphragm 46 preferably made of sheet metal. The marginal portion of the diaphragm 46 is fixed to a concave sheet metal plate 48 which, in connection with said diaphragm, forms a chamber hereinafter designated as 46—48. Each of the diaphragms is acted upon by a coiled spring 49 which normally maintains the central part of the diaphragm in its lowermost position. To the central part of the plate 48 is connected a tube 50 leading to said chamber. This tube is secured to an adjacent portion of the frame 2 as by means of a thimble or bracket attached to the frame and constitutes a rigid support for the chamber 46—48.

Each of the arms 42 is adjustable in three different positions to control the ride. In order to assist in locating definitely each arm in any one of these three positions, an arcuate contact plate 52 carried by the outer end of a bracket 54 secured to the side of the corresponding cylinder 16 is arranged so that said arm swings past the outer face thereof and said plate is provided with projections 56 constituting limiting stops for engagement with the arm to limit the upward and downward movement thereof. When engaged with the upper stop 56, the arm 42 lies in its upper ride controlling position and when engaged with the lower stop 56, said arm lies in its lower ride controlling position. The plate 52 is also provided with three recesses 58 corresponding with the three positions of the arm 42 and a spring pressed detent ball 60 is mounted in a bore in the outer end of said arm for engagement alternatively in said recesses.

The vertical position of each of the diaphragms is controlled by the degree of vacuum produced in each chamber 46—48 and the degree of vacuum in these chambers is varied to adjust the valves of the shock absorbers in the desired positions.

Each of the pipes 50 is connected with a vacuum pipe line 62 extending about the frame 2 and to this line is connected one end of a pipe 64 the other end of which is connected with a valve casing 66 supported by a housing 67 attached to the lower end of the steering post 26. This valve casing is provided with a valve seat 68 which is engaged by a valve 70 fixed to a valve stem 72 mounted for longitudinal movement in a guide 74 formed on the valve casing. The valve is normally held in closed position by means of a coiled spring 78. The valve 70 is opened at certain times by means of a cam plate 80 fixed to a shaft 82 and having cam projections 80a and 80b on its edge for engaging the end of the valve stem 72 projecting from the valve casing.

The valve casing 66 is connected by means of a pipe 84 with a vacuum chamber 86. This chamber comprises a substantially rigid wall 88 having the form in cross section shown in Fig. 3 and a flexible diaphragm 90 secured at its margin to said wall and is provided with an outlet 91. A cover plate 92 having openings 93 is also secured to the margin of the wall 88 outside of the diaphragm 90 as shown in Fig. 3. Mounted upon the central portion of the diaphragm 90 is a valve 94 secured to a stem 96 arranged to slide in a suitable guide formed in the cover plate 92. The valve 94 is arranged to engage a valve seat 98 formed on the wall 88 and the diaphragm is acted upon by a relatively light coiled spring 100 which tends to move the valve to closed position. The engagement of the valve 94 with the seat 98 closes the outlet 91 to the vacuum chamber 86. The wall 88 is provided with a substantially conical extension 102 forming a second chamber connected with the chamber 86 when the valve 94 is in open position. To the chamber 102 is connected a pipe 104 leading to a vacuum pump 106, preferably driven in a suitable manner from a rotating engine element. This pump is preferably of the type which is automatically thrown out of operation when the vacuum in the line connected therewith rises above a predetermined degree and is automatically thrown into operation when said vacuum falls below said degree. The pump 106 is connected by a pipe 108 with the intake manifold 109 of the internal combustion engine 111 through which the required degree of vacuum may be produced in the line when the engine is in operation. Pump 106 is required to maintain sufficient suction in the pipe 104 for effectively operating the control mechanism when suction in the engine manifold becomes reduced under varying engine operating conditions.

The mechanism for controlling the valve 94 comprises a coiled spring 110 interposed between the valve and a plunger 112 mounted for longitudinal movement in a guide 114 secured to and preferably formed integral with the chamber 102 and the housing 67. To the plunger 112 is fixed a radially extending pin 116 which engages in a spiral slot 118 formed in the guide 114. Through the engagement of the pin 116 in this slot the plunger 112 is moved longitudinally by the rotary movement of said plunger in the guide 114. In order to locate the plunger 112 in any one of three definite angular positions, three notches 120 are formed in the upper edge of the slot to receive the pin. The plunger is acted upon by a coiled spring 122 which tends to move the plunger upwardly and maintains the pin 116 in engagement with the edge of the guide 114 at the upper side of the slot 118.

The plunger 112 is rotated to adjust the same longitudinally by means of a projection 124 on the lower end of the shaft 82 which engages in a slot 126 formed in the plunger. The shaft 82 is mounted to turn in suitable bearings in the steering post 126 and to the upper end thereof is secured an arm 128 located above and adjacent the central portion of the steering wheel 130 by which said shaft may be turned manually to adjust the plunger 112. The arm 128 is arranged to swing over a disk 131 attached to the steering post and preferably having thereon insignia to indicate the position of the arm required to adjust the valves of the shock absorbers to give a predetermined ride.

The parts are shown in Figs. 3, 4, 5 and 7 in the positions which they assume when the plunger 112 is adjusted in an intermediate position to produce a "medium" ride. In adjusting the mechanism to adjust the valves 24 of the shock absorbers for a "soft" ride, the arm 128 is turned to the "soft" ride position. By this counter-clockwise adjustment of the arm the plunger 112 is turned counter-clockwise to locate the pin 116 in the highest of the three notches 120 and to engage the projection 80a on the cam plate 80 with the end of the valve stem 72 to hold the valve 70 in open position thus opening the pipes 64, 62 and 50 to atmosphere. With this adjustment of the plunger, the spring 110 is relatively slack and the valve 94 is held in engagement with the valve seat 98 by the pressure of the light spring 100 and the partial vacuum within the chamber 102. The diaphragms 46 are then subjected to atmospheric pressure on both sides thereof and the diaphragms and the arms 42 will assume their lowermost positions under the action of springs 49, the detent ball 60 carried by each arm being engaged in the lowest of the three recesses 58 in the adjacent contact plate 52.

To adjust the shock absorber valves 24 to produce a "medium" ride, the arm 128 is turned clockwise to the "medium" ride position. By this adjustment of the arm the plunger 112 is rotated clockwise to engage the pin 116 in the intermediate of the three recesses 120. This will move the plunger axially downwardly or to the left Fig. 3 thereby comprising the coiled spring 110 and the pressure of this spring will force the valve 94 out of engagement with the valve seat 98. During the rotary movement of the shaft 82 in adjusting the plunger 112 the projection 80a on the cam plate 80 is carried out of engagement with the valve stem 72 allowing the valve 70 to close, the cam plate being located substantially in the position shown in Fig. 4 when the adjustment of the plunger is completed. As soon as the valve 70 is closed and the valve 94 is opened a partial vacuum is produced in the chamber 86 and this vacuum is increased until the pressure on the outside of the diaphragm 90 moves the valve 94 again into engagement with the seat 98. This occurs when a predetermined degree of vacuum has been produced in the chamber 86. During this operation a corresponding degree of vacuum will be produced in the chambers 46—48 and the diaphragms 46 and the arms 42 of the shock absorbers will be moved upwardly to intermediate positions, the detent balls carried by each arm then being engaged in the central one of the recesses 58 in the adjacent contact plate 52.

In order to adjust the shock absorber valves 24 to produce a "hard" ride the arm 128 is turned clockwise to the "hard" ride position. By this adjustment of the arm the plunger 112 is rotated clockwise to locate the pin 116 in the lowermost of the recesses 120 and the cam plate 80 is rotated to carry the cam projection 80b past the end of the valve stem 72 so that the valve 70 is located in closed position at the completion of the adjustment. The longitudinal movement of the plunger 112 further compresses the spring 110 and the valve 94 is opened by the pressure exerted by the spring. The vacuum then increases in the vacuum chamber 86 until the pressure on the outside of the diaphragm 90 actuates the diaphragm to engage the valve 94 with the valve seat 98. This occurs when the vacuum developed in the chamber 86 reaches a predetermined degree substantially higher than the vacuum developed in said chamber when the plunger 112 was adjusted in intermediate position. A corresponding degree of vacuum is produced in the chambers 46—48 and the diaphragms 46 and the arms 42 are moved to their uppermost positions, the detent balls 60 carried by each arm being engaged in the uppermost of the three recesses 58 in the adjacent contact plate.

In adjusting the valves of the shock absorber from "hard" ride to "medium" ride position, the arm 128 is turned from "hard" ride to "medium" ride position and the plunger 112 is thereby adjusted to disengage the pin 116 from the lowermost of the three recesses 120 and to engage said pin in the intermediate one of said recesses. During the rotation of the shaft 82 to produce this adjustment of the plunger the projection 80b on the cam plate 80 is engaged with the end of the valve stem 72 and the valve 70 is opened, the cam plate being located substantially in the position shown in Fig. 4 with the projection 80b disengaged from the valve stem so that the valve is held in closed position when the adjustment of the plunger is completed. The temporary opening of the valve 70, allowing the air to enter the valve casing 66 and to pass through the pipe 84 into the chamber 86, reduces the vacuum in the latter chamber so that the valve 94 opens under the pressure of the coiled spring 110. As soon as the valve 70 is closed, the vacuum again increases in the chamber 86 until the pressure on the outside of the diaphragm 90 actuates the diaphragm to close said valve. This occurs when a predetermined degree of vacuum is developed in the chamber 86, this degree of vacuum being substantially the same as when the plunger 112 previously occupied its intermediate position. Thus the diaphragms 46 and the arms 42 will again be adjusted into intermediate positions.

In adjusting the valves of the shock absorbers from "medium" to "soft" ride positions, the arm 128 is turned from "medium" to "soft" ride position thereby adjusting the plunger 112 to locate the pin 116 in the uppermost of the recesses 120. During the rotation of the shaft 82 to produce this adjustment of the plunger, the cam plate 80 is rotated to engage the projection 80a thereon with the end of the valve stem 72, this projection remaining in engagement with the valve stem to hold the valve 70 in open position when the adjustment is completed. With this adjustment of the plunger 112, the outside air, passing freely into the vacuum chamber and vacuum line through the opening in the valve casing 66 relieves the partial vacuum in the chamber and vacuum line and the diaphragms 46 and the arms 36 will be restored to their lowermost positions by the action of the springs 49. The spring 110 will then be in slackened condition and the valve 94 will be held in engagement with the seat 98 by the coiled spring 100 and by the partial vacuum in the vacuum chamber 86.

In the present construction the control valves of the shock absorbers are all adjusted by power operated mechanism having a remote manual control located in a position at which it may be easily and conveniently adjusted by the driver. The only effort required of the driver in adjusting the shock absorbers is to turn the control arm 128 manually to the required angular position to produce the desired ride. Upon adjusting this arm the several control valves are quickly and accurately adjusted in a reliable manner by the action of the power mechanism.

It is to be understood that the invention is not limited to the particular construction of the illustrated embodiment but that this construction is merely illustrative of the invention and that the invention may be embodied in other forms within the scope of the claims.

What is claimed is:

1. In a fluid control system, a suction line having an opening leading to atmosphere, a self-closing valve associated with the opening in said line, loaded valve mechanism closed in response to pressure, and cam means operable to momentarily open said valves, and to change the loading of said loaded valve mechanism resisting pressure closing thereof.

2. In a fluid control system, a suction line, a casing interposed in said suction line having a neck portion constituting an inlet chamber, a diaphragm within said casing and secured peripherally thereto, a valve secured to the diaphragm within said casing for closing the inlet chamber, a spring on the opposite side of the diaphragm from the valve normally urging it into closed position, the side of said casing adjacent said spring having an opening therein leading to atmosphere, a plunger slidable in the neck portion of said casing, a spring between the inner end of said plunger and said valve, means operable to rotate said plunger, and a pin projecting from the periphery of said plunger, said casing neck having a cam groove therein and detents along one edge of said groove, rotation of said plunger varying the compression on the spring interposed between the valve and the plunger to regulate the pressure required to seat the valve and close the inlet chamber, the arrangement of the pin in the detents in the cam groove wall normally maintaining the plunger in adjusted position.

3. A fluid regulator comprising a fluid suction line, a loaded valve in said line regulating the flow of said fluid in said line, said valve being automatically closed by pressure, a normally closed valve on the regulating side of said loaded valve for raising the pressure on said side when opened, and physically operable means for unseating and varying the resistance to closing of said loaded valve and momentarily opening said relief valve simultaneously.

4. A fluid regulator comprising a fluid suction line closed at one end, a pressure closed loaded valve in said line, a self closing valve intermediate said closed end and said loaded valve for raising the pressure in the line when open, and an element operable for simultaneously opening and varying the resistance to closing of said loaded valve and for momentarily opening said pressure relieving valve.

5. A vacuum regulator comprising a vacuum line closed at one end, a pressure closed valve for trapping vacuum in said closed end, means for variably loading said valve in a manner opposing its closure, self closing valve means for relieving said trapped vacuum upon each opening of said pressure closed valve, and means for opening said valve means and setting the loading of said pressure closed valve simultaneously.

6. In a pressure control system, a fluid line having an opening intermediate its ends leading to atmosphere, means connected with one end of the line for reducing pressure therein below that of atmosphere, a self-closing valve for the opening in the line, a control valve in the line between the opening and the pressure reducing means, a diaphragm connected to said control valve, said diaphragm being exposed on one side to atmosphere and on the other side to pressure in the line, a light spring acting against the side of said diaphragm exposed to atmosphere for urging the diaphragm in a direction to seat the control valve, a spring engaging said control valve exerting a pressure greater than that of the light spring in a direction to unseat the control valve, means for varying the pressure on the valve engaging spring, means for unseating said self-closing valve, and physically operable means for simultaneously actuating said spring pressure varying means and said valve unseating means.

7. In a fluid system having a fluid line connected at one end to control a device and at the other end with pressure reducing means, means for controlling the pressure in said line comprising valve means for opening or closing said line to atmosphere, a pressure closed loaded valve in the line between said pressure reducing means and the first mentioned valve, means for varying the loading of said valve in the line opposing its closing, means for controlling the opening of said first mentioned valve, and a physically rotatable member for simultaneously actuating said valve controlling means to open said first mentioned valve upon each opening of said loaded valve and said loading varying means.

PETER F. ROSSMANN.